(12) United States Patent
Saleh et al.

(10) Patent No.: US 11,783,529 B2
(45) Date of Patent: Oct. 10, 2023

(54) BOUNDING VOLUME HIERARCHY BOX NODE COMPRESSION

(71) Applicant: Advanced Micro Devices, Inc., Santa Clara, CA (US)

(72) Inventors: Skyler Jonathon Saleh, San Diego, CA (US); Chen Huang, Monrovia, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/562,889

(22) Filed: Dec. 27, 2021

(65) Prior Publication Data

US 2023/0206540 A1    Jun. 29, 2023

(51) Int. Cl.
*G06T 15/06* (2011.01)
*G06T 1/60* (2006.01)

(52) U.S. Cl.
CPC ............... *G06T 15/06* (2013.01); *G06T 1/60* (2013.01); *G06T 2210/12* (2013.01); *G06T 2210/21* (2013.01)

(58) Field of Classification Search
CPC ... G06T 15/06; G06T 15/005; G06T 2210/12; G06T 15/10; G06T 2210/21; G06T 17/10
See application file for complete search history.

(56) References Cited

U.S. PATENT DOCUMENTS

| 8,970,584 | B1 | 3/2015 | Aila et al. |
| 10,818,061 | B2 * | 10/2020 | Hutchinson ....... G06F 18/23213 |
| 2019/0259195 | A1 | 8/2019 | Woop et al. |
| 2019/0318445 | A1 | 10/2019 | Benthin et al. |
| 2020/0051314 | A1 | 2/2020 | Laine et al. |
| 2020/0320776 | A1 | 10/2020 | Doyle et al. |

OTHER PUBLICATIONS

Ylitie, H., et. al., "Efficient Incoherent Ray Traversal on GPUs Through Compressed Wide BVHs", HPG '17 Proceedings of High Performance Graphics, Article No. 4, Jul. 2017, 13 pgs.

* cited by examiner

*Primary Examiner* — Hau H Nguyen
(74) *Attorney, Agent, or Firm* — Volpe Koenig

(57) ABSTRACT

A technique for performing ray tracing operations is provided. The technique includes combining one or more common exponent values of a compressed box node with one or more minimum vertex mantissas of the compressed box node and one or more maximum vertex mantissas of the compressed box node to obtain one or more minimum vertices and one or more maximum vertices; and combining a minimum vertex of the one or more minimum vertices and a maximum vertex of the one or more maximum vertices to obtain a bounding box for a compressed box data item of the compressed box node.

20 Claims, 7 Drawing Sheets

BOUNDING VOLUME HIERARCHY BOX NODE COMPRESSION

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes combining one or more common exponent values of a compressed box node with one or more minimum vertex mantissas of the compressed box node and one or more maximum vertex mantissas of the compressed box node to obtain one or more minimum vertices and one or more maximum vertices; and combining a minimum vertex of the one or more minimum vertices and a maximum vertex of the one or more maximum vertices to obtain a bounding box for a compressed box data item of the compressed box node.

Figure 1:
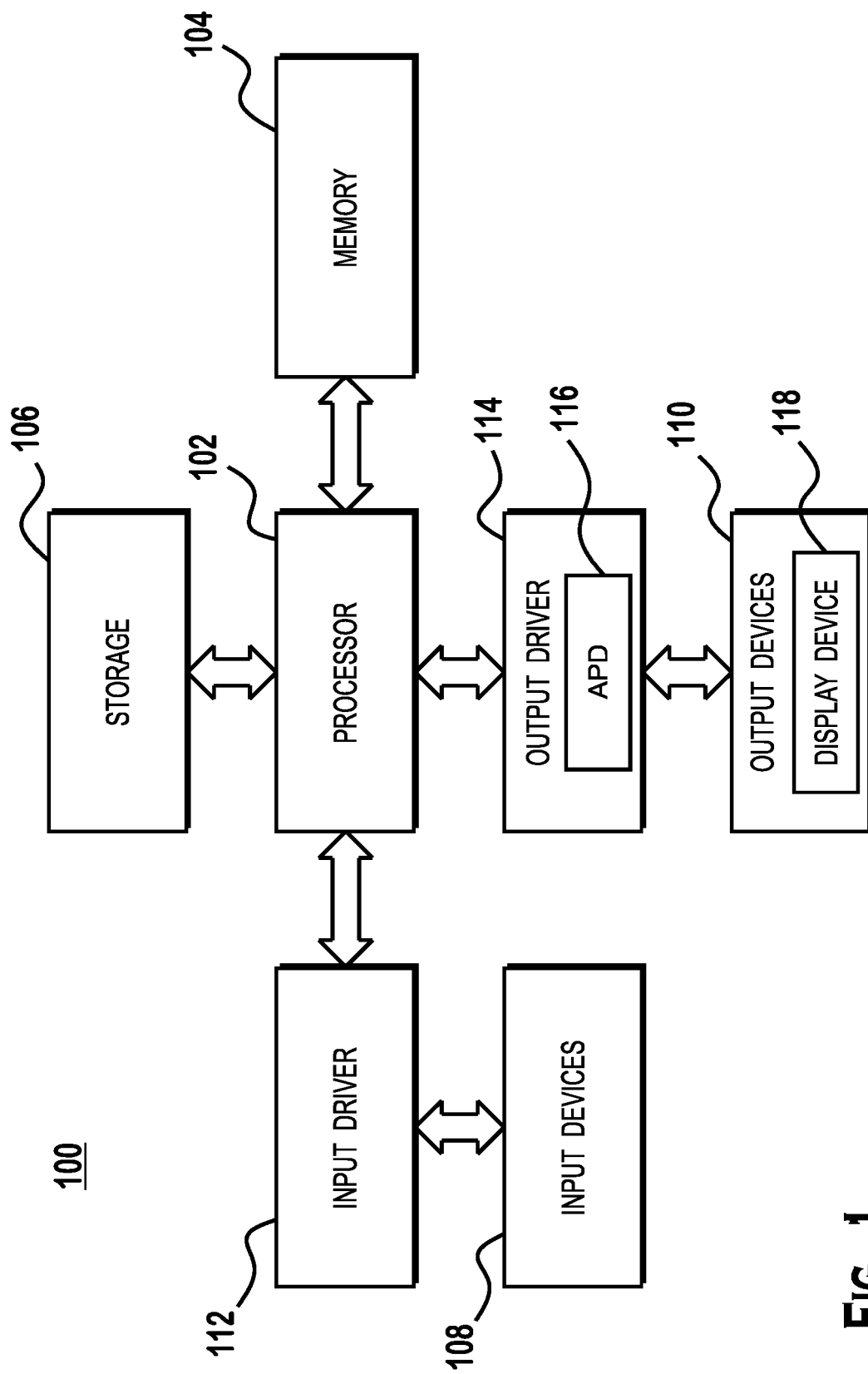
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
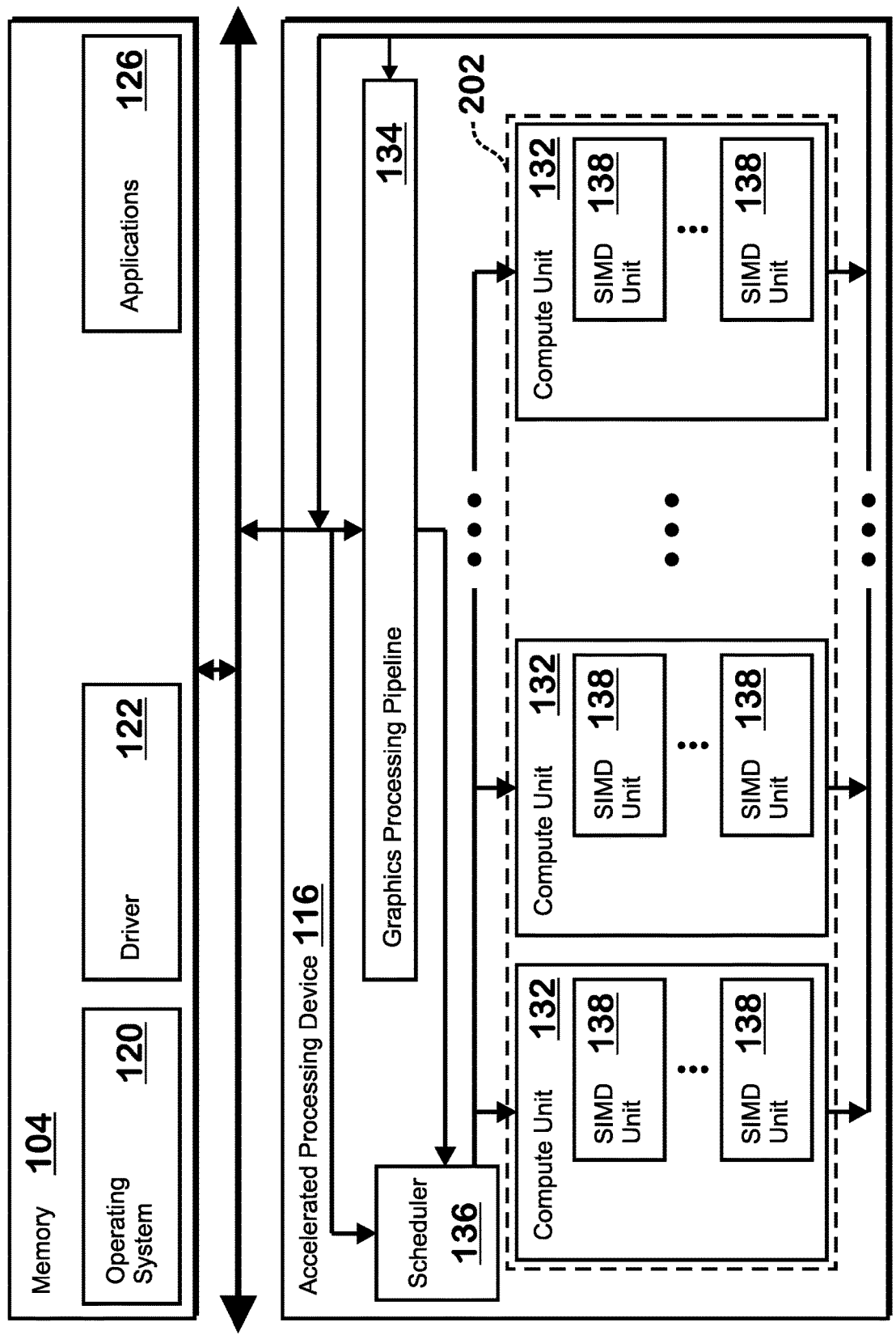
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (together, parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
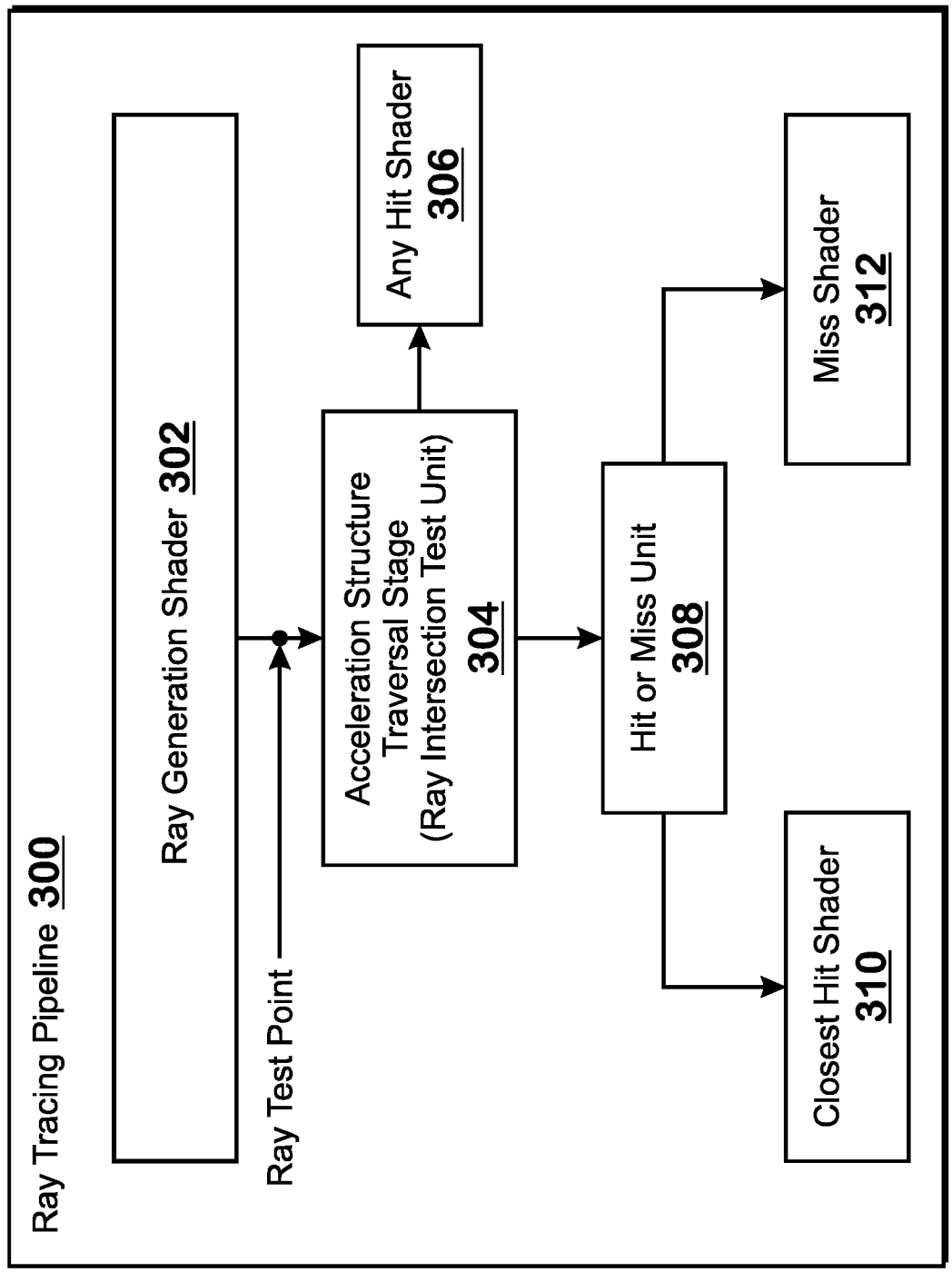
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
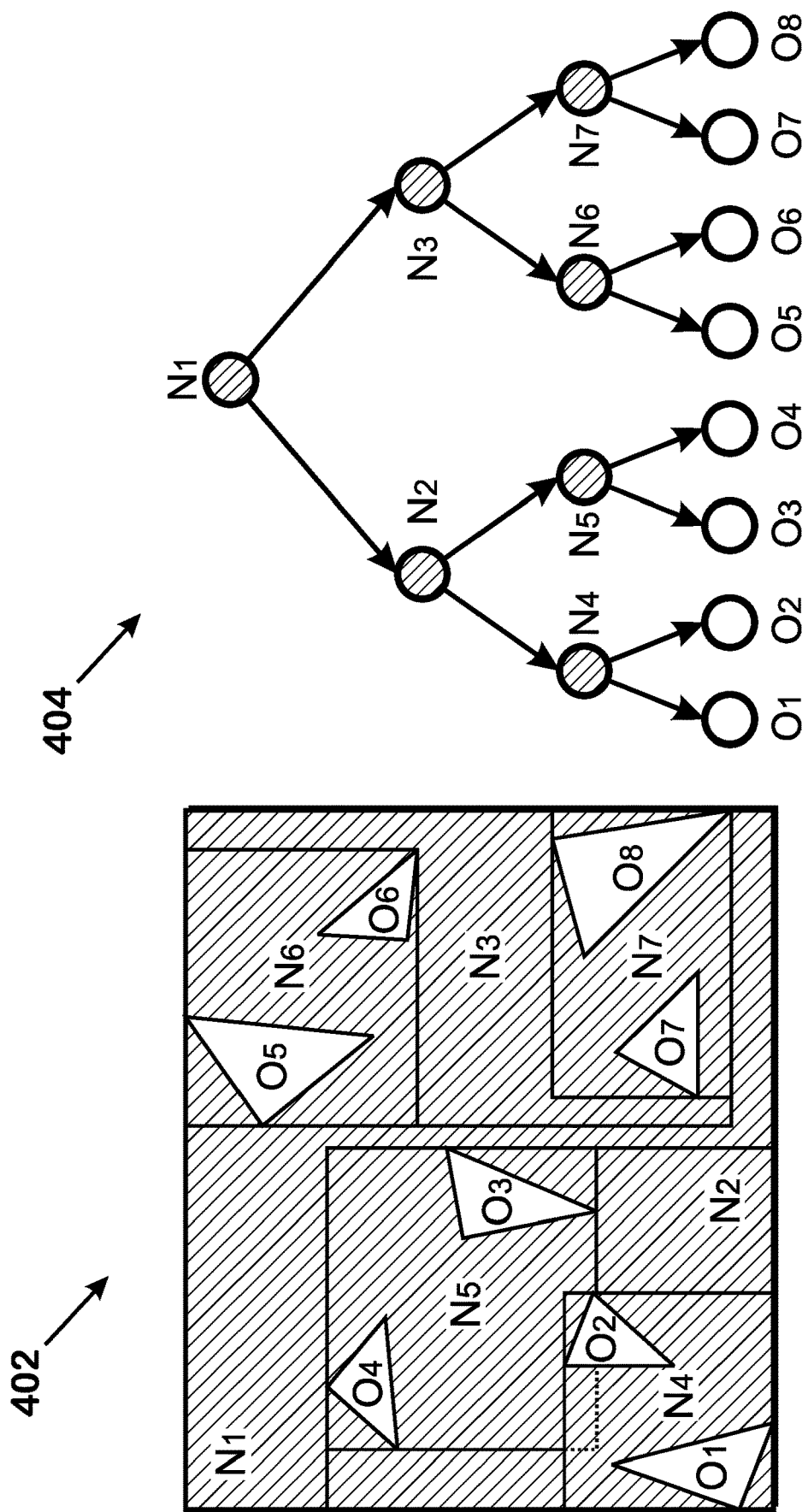
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

Figure 5:
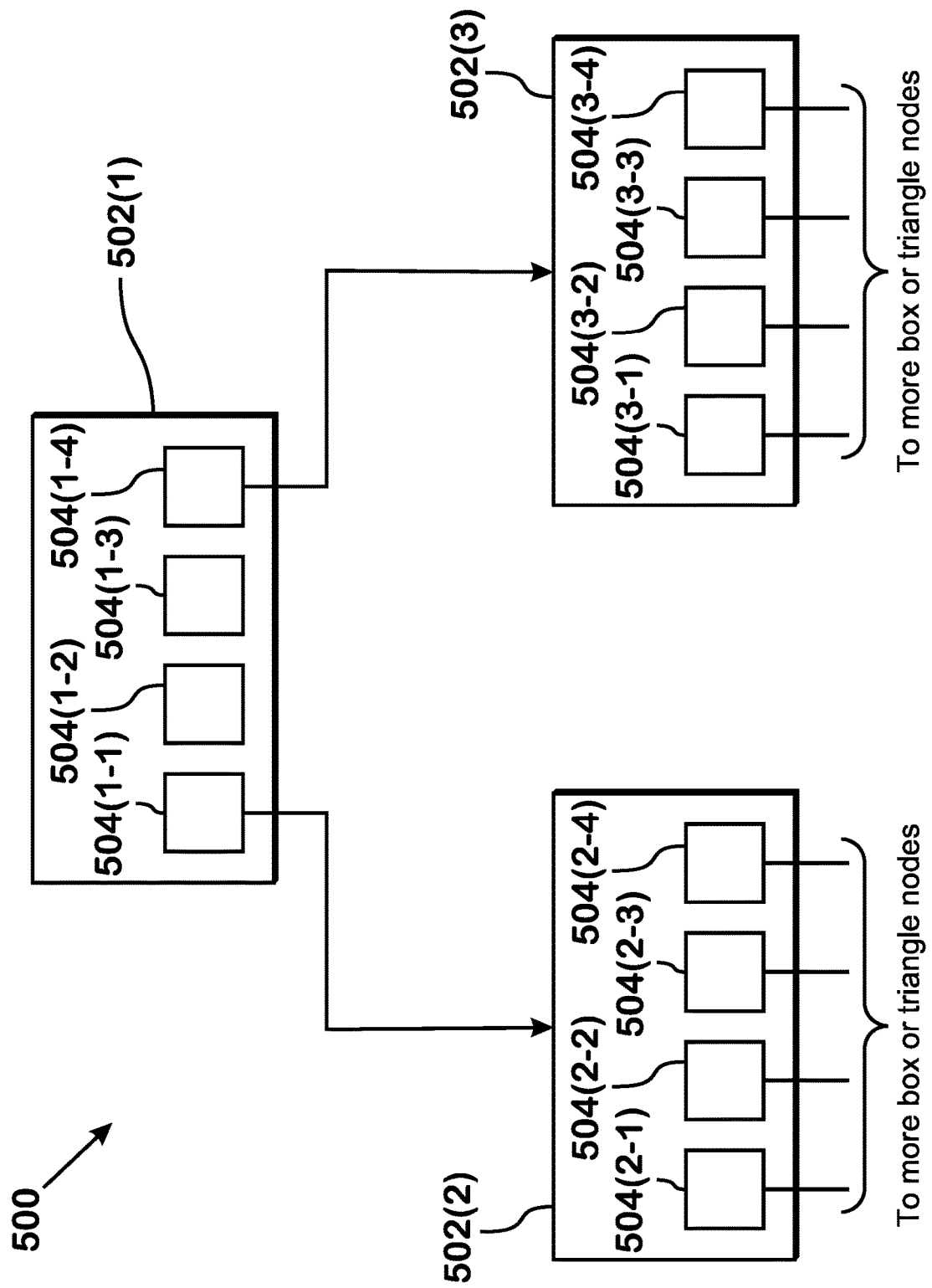
FIG. 5 illustrates an example bounding volume hierarchy including box nodes.

FIG. 5 illustrates an example bounding volume hierarchy 500 including box nodes 502. A node, such as a box node 502, represents a unit of data that includes data for multiple geometry elements (such as bounding boxes). A box node 502 includes box data items 504. The box data items 504 describe bounding boxes, which are similar to the boxes ("N") of FIG. 4. Each box data item 504 includes a description of the geometry of a bounding box (for example, a minimum vertex and a maximum vertex) as well as a pointer to another box node 502 or triangle node (not shown in FIG. 5). The bounding box for a box data item 504 encloses the geometry within the node that the pointer points to. In other words, a box data item 504 for a bounding box points to a node whose geometry fits within that bounding box. A triangle block (not shown) includes data for one or more triangles, which are similar to the triangles ("O") of FIG. 4.

To traverse the illustrated BVH 500, the ray tracing pipeline 300 begins at a box node 502 and tests the ray for intersection with the bounding boxes of the box data items of that box node 502. If an intersection test fails, then the ray tracing pipeline 300 eliminates all children of that box data item 504 from consideration. If the intersection does not fail, then the ray tracing pipeline 300 tests the children of that box data item 504. Some box data items 504 point to box nodes 502 and some box data items 504 point to triangle nodes. In response to the ray tracing pipeline 300 arriving at a triangle node, the ray tracing pipeline 300 performs a ray intersection test to determine whether the ray intersects the one or more triangles of the triangle node. In response to the ray tracing pipeline 300 arriving at a box node, the ray tracing pipeline 300 tests the children of that box node as described above.

Figure 6:
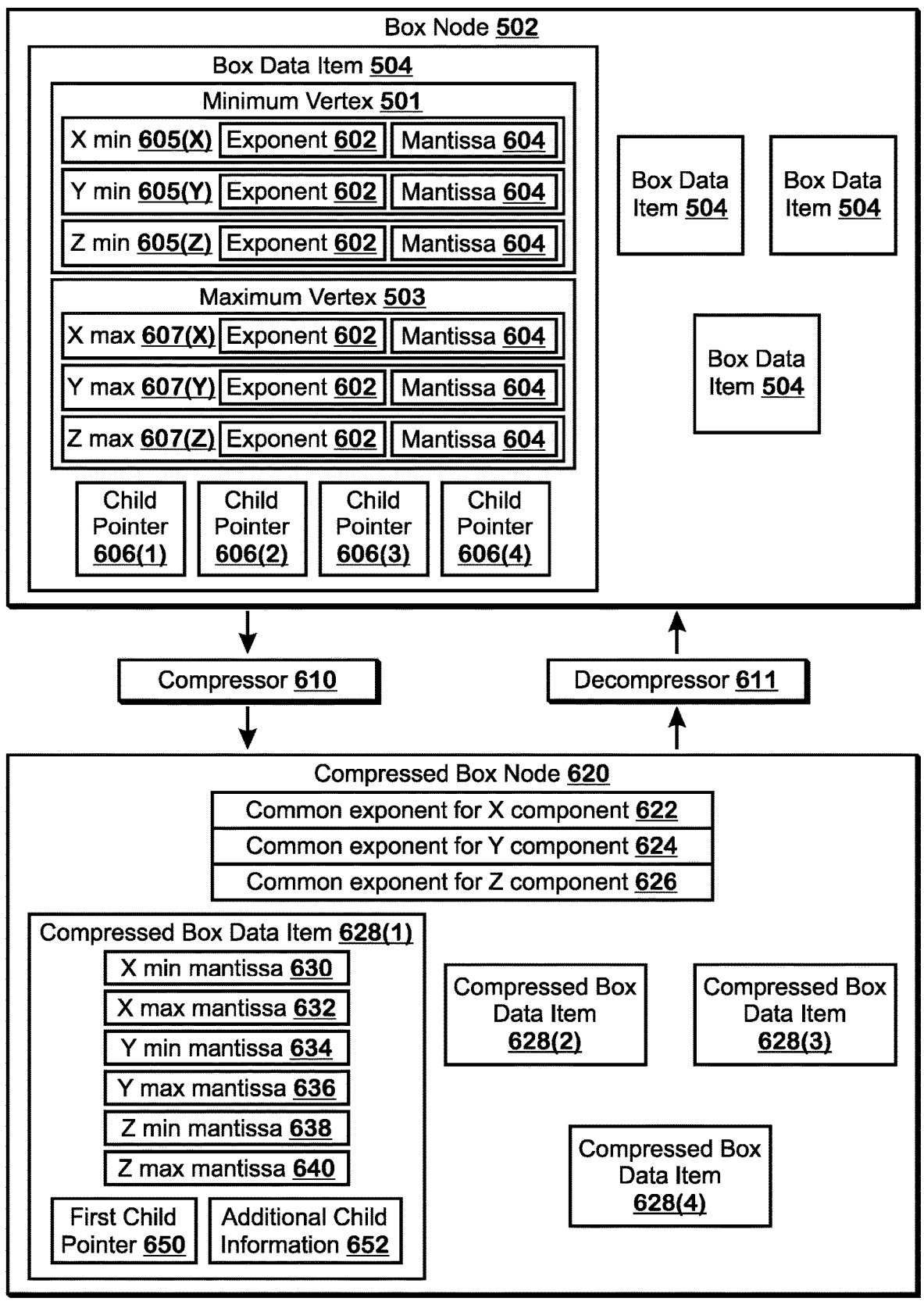
FIG. 6 illustrates a compression scheme for box nodes, according to an example.

FIG. 6 illustrates a compression scheme for box nodes 502, according to an example. A compressor 610 converts a box node 502 into a compressed box node 620 that consumes less data than the uncompressed box node 502. The compressor 610 is any technically feasible entity capable of performing the compression described herein. In some examples, the compressor 610 is software, hardware, or a combination thereof. In some examples, the compressor 610 is a part of a computer system that belongs to an application developer who generates a bounding volume hierarchy "offline" (that is, not while the application is running on an end user device). In other examples, the compressor 610 is part of a computer system that executes an application for an end user. In some examples, the compressor 610 compresses the box node 502 while the application is running on an end user device or on another device. In some examples, the compressor 610 is software executing on a processor 102, on an APD 116, or on another processor. In some examples, the compressor 610 is or is part of hard-wired circuitry present in any device such as the device 100 (for example, within the processor 102, within the APD 116, or within another portion.

The box node 502 includes several box data items 504 (for example, four box data items 504). Each box data item 504 includes a minimum vertex 501 and a maximum vertex 503 that together specify a bounding box. In some implementations, the bounding boxes specified by the box data items 504 are axis aligned, which means that each face is aligned with the axis planes. Such bounding boxes can be defined through a minimum vertex 501, which defines the minimum extent of the box in each axis, and a maximum vertex 503, which defines the maximum extent of the box in each axis. The minimum vertex 501 and maximum vertex 503 are each defined by an x, y, and z component. In the example, shown, the minimum vertex 501 includes the minimum X component 605(X), the minimum Y component 605(Y), and the minimum Z component 605(Z). Additionally, the maximum vertex 503 includes the maximum X component 607(X), the maximum Y component 607(Y), and the maximum Z component 607(Z).

Each minimum component 605 and maximum component 607 is a floating point number that therefore includes an exponent 602 and a mantissa 604. The box data item 504 also includes a plurality of child pointers 606. Because a single box data item 504 is associated with one single node (i.e., a box node or a triangle node), each child pointer 606 in a box data item 504 points to a different box data item 504 of the same node. Although not shown, the other box data items 504 in the illustrated box node 502 also include a minimum vertex 501, a maximum vertex 503, and child pointers 606.

Typically, the exponent values for each axis are very similar, even across box data items 504. Thus, the compressor 610 generates a compressed box node 620 by removing the exponents from the individual box data items 628 and including a common exponent for the X component 622, a common exponent for the Y component 624, and a common exponent for the Z component 626. Thus, each compressed box data item 628, which replaces the box data items 504 of the uncompressed box node 502, includes an X minimum mantissa 630, an X maximum mantissa 632, a Y minimum mantissa 634, a Y maximum mantissa 636, a Z minimum mantissa 638, and a Z maximum mantissa. The X minimum mantissa 630 and the common exponent for the X component 622 form the X component for the minimum vertex 501 of the uncompressed box node 502. Similarly, the Y minimum mantissa 634 and the common exponent for the Y component 624 form the Y component for the minimum vertex 501 of the uncompressed box node 502 and the Z minimum mantissa 638 and the common exponent for the Z component 626 form the Z component for the minimum vertex 501 of the uncompressed box node 502. Similarly, the X maximum mantissa 632 and common X exponent 622 form the X component for the maximum vertex 503 of the uncompressed box node 502, the Y maximum mantissa 636 and the common Y component 624 form the Y component for the maximum vertex 503, and the Z maximum mantissa 640 and the common Z component 626 form the Z component for the maximum vertex 503. The common X exponent 622, common Y component 624, and common Z component 626 are shared across the compressed box data items 628 in a compressed box node 620, and thus exponents do not need to be individually stored for each component.

In general, sharing the exponents with the minimum and maximum components in different compressed box data items 628 is possible because the scale of the different bounding boxes within a box node 502 is roughly the same. Sharing the exponent values reduces the amount of space required for a compressed box node 620 by greatly reducing the number exponent values that are included within the compressed box node 620.

In addition to the above, in some implementations, the child pointers 606 are compressed. Specifically, by having all compressed box data items 628 in a compressed box node 620 adjacent in memory, it is possible to store a pointer to the first box data item 628, along with implicit or explicit size information for calculating an offset from that pointer address. More specifically, as described elsewhere herein, in the uncompressed box node 502, a box data item 504 that is associated with a child box node 502 includes child pointers 606 to each of the box data items 504 of the child box node. To access any particular box data item 504 in the child box node using this information, the child pointer 606 is used to find the memory location of that box data item 504. In the compressed box node 620, a first child pointer 650 and additional child information 652 is included. The first child pointer 650 points to the first compressed box data item 628 of the child node. The additional child information 652 includes information for finding the other compressed box data items 628 of the child compressed box node 620. In some examples, the additional child information 652 includes information indicating the size of the compressed box data items 628. This size information allows access to a particular compressed box data item 628 of the child by adding, to the address specified by the first child pointer 650, the sizes of all of the compressed box data items 628 that are prior to the particular compressed box data item 628. In some examples, the additional child information 652 includes type information that specifies the type of the compressed box data items 628 that are included in the child compressed box node 620. This type information implicitly describes the size of the compressed box data items 628 in the child node. Thus any compressed box data item 628 could be accessed by adding, to the address of the first child pointer 650, the size of each compressed box data item 628 prior to the desired compressed box data item 628, where this size is determined by the type information.

In some implementations, other techniques are alternatively or additionally applied to compress the box nodes 502 to generate the compressed box nodes 620. In some examples, the mantissas in the compressed box nodes 620 are smaller than the mantissas 604 in the uncompressed box nodes 502.

Figure 7:
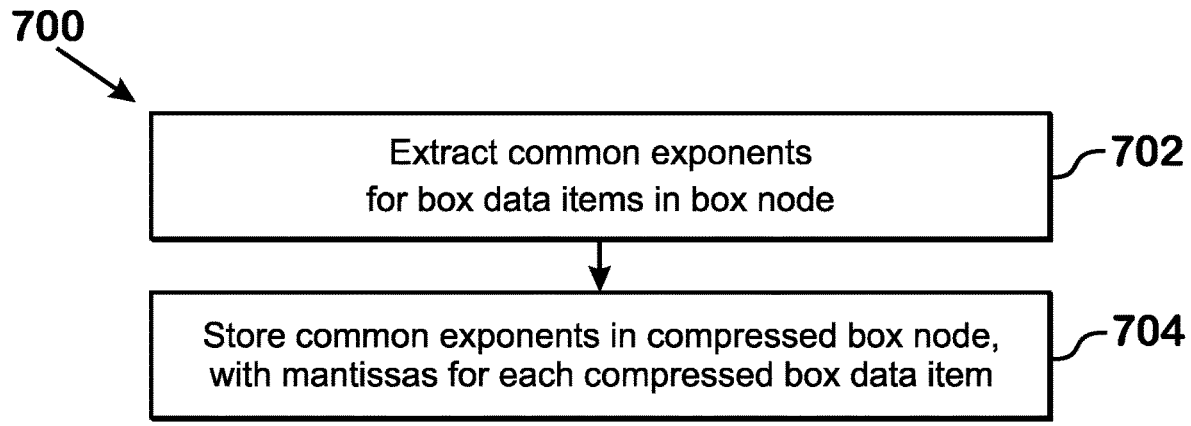
FIG. 7 is a flow diagram of a method for compressing a box node, according to an example.

FIG. 7 is a flow diagram of a method 700 for compressing box nodes 502 to generate compressed box nodes 620, according to an example. Although described with respect to the system of claims 1-6, those of skill in the art will recognize that any system configured to perform the steps of the method 700 in any technically feasible order falls within the scope of the present disclosure.

The compressor 610 generates a compressed box node 620 from a box node 502 in the following manner. At 702, the compressor 702 extracts common exponents for box data items 504 in a box node 502. More specifically, the compressor 610 identifies a single exponent value for each of the x, y, and z components of each of the box data items 504, to be used as the common X exponent 622, the common Y exponent 624, and the common Z exponent 626. In some examples, the compressor 610 identifies, as an exponent for one of the components, one of the exponent values 602 of at least one of the component values of one of the minimum vertices 501 or maximum vertices 503 of one of the box data items 504. In other examples, the compressor 610 identifies, as the exponent for one of the components, an intermediate value that is in between but not equal to the exponent values of each the components found within each of the box data items 504. In an example, if the exponents are 10, 10, 10, 11, 11, 11, 13, and 15, for the X component of the minimum and maximum vertices of the box data items 504, the compressor 610, may include one of the values (for example, 11) as the common X exponent 622, or may use an intermediate value such as 14 as the common X exponent 622. Any other technically feasible means for identifying a common exponent from the set of exponents 622 of a box node are possible. At step 704, the compressor 610 stores the common components in a compressed box node 620, with mantissas for each compressed box data item.

In addition, the compressor 610 generates the first child pointers 650 for the compressed box data items 628. The first child pointers 650 point to the first compressed box data item 628 of the box node 620 associated with each particular compressed box data item 628. In addition, the compressor 610 stores the additional child information 652 in the compressed box data item 628. In addition to the above, in some implementations, the compressor 610 shrinks the size of the mantissas to generate the compressed mantissas in the compressed box node 620.

Figure 8:
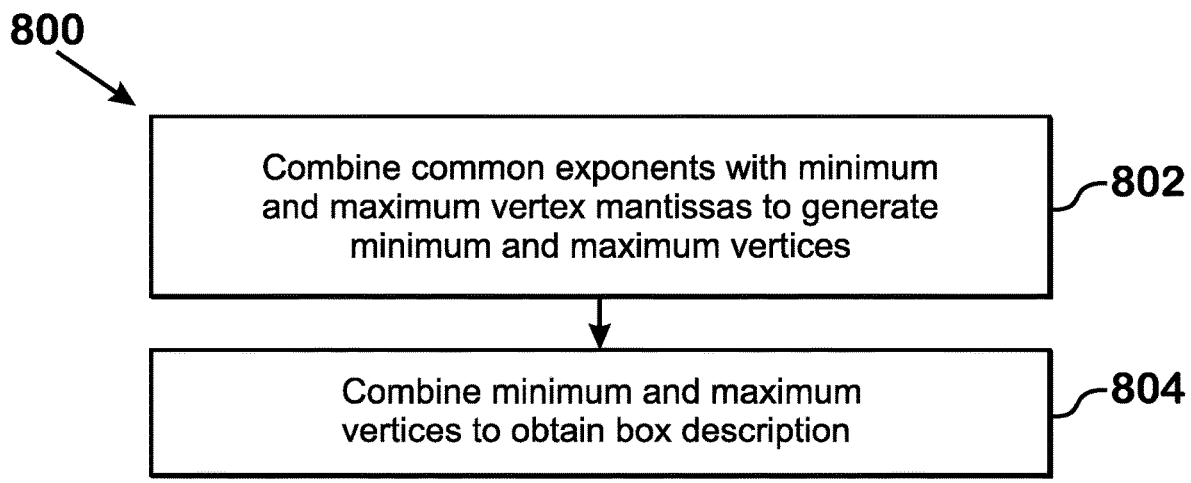
FIG. 8 is a flow diagram of a method for decompressing a compressed box node, according to an example.

FIG. 8 is a flow diagram of a method 800 for decompressing compressed box nodes 620 to generate box nodes 502. Although described with respect to the system of claims 1-6, those of skill in the art will recognize that any system configured to perform the steps of the method 800 in any technically feasible order falls within the scope of the present disclosure.

A decompressor 611 generates the decompressed box nodes 502 from the compressed box nodes 620. The decompressor 611 is embodied as software, hardware, or a combination thereof. In various examples, the decompressor 611 is within (or executing on) any of the processor 102, the APD 116, or another entity. In various examples, at least a portion of the decompressor 611 is a hardware circuit included within, e.g., the APD 116, the processor 102, or another entity. In some examples, the decompressor 611 interfaces with memory that stores at least a part of a bounding volume hierarchy while the ray tracing pipeline 300 traverses an acceleration structure. For example, when the ray tracing pipeline 300 requests to read a box node, the decompressor 611 decompresses the compressed box node 620 to generate a decompressed box node 502. To decompress the compressed box node 620, at step 802, the decompressor 611 combines the common exponent for each of the X, Y, and Z components, with the minimum and maximum X, Y, and Z mantissas to generate the X, Y, and Z components of the minimum and maximum vertices. In some implementations, there is no need to reconstitute the child pointers—the decompressor 611 simply uses the compressed child pointer information (first child pointer 650 and additional child information 652) to read the appropriate compressed box data items 628 and generate the corresponding floating point numbers. However, in other implementations or modes of operation, the decompressor 611 reconstitutes the child pointers 606 by generating new child pointers 606 that point to the decompressed box data items 504. In examples where the size of the mantissa is reduced, the decompressor 611 increases the size of the mantissas through any technically feasible technique such as by using padding. At step 804, the decompressor 611 combines the minimum and maximum vertices to obtain a box description. In some examples, this box description includes a decompressed box data item 504 while in other examples, the box description is not in the form of a box data item 504 but is used directly by the entity that requires the bounding box information (such as the ray tracing pipeline 300).

Figure 9:
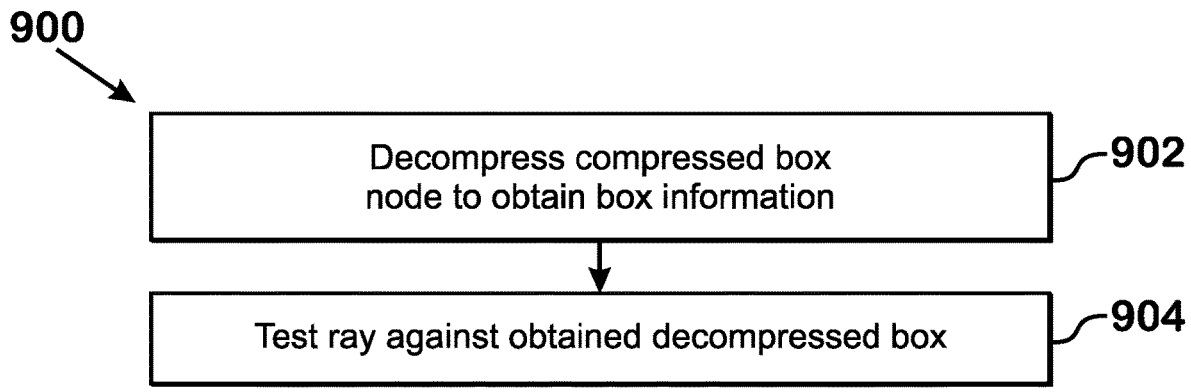
FIG. 9 is a flow diagram of a method for utilizing compressed box nodes to test a ray for intersection, according to an example.

FIG. 9 is a flow diagram of a method 900 for utilizing compressed box nodes 502 to test a ray for intersection, according to an example. Although described with respect to the system of claims 1-6, those of skill in the art will recognize that any system configured to perform the steps of the method 900 in any technically feasible order falls within the scope of the present disclosure.

At step 902, an entity such as a processor (e.g., processor 102 or APD 116) decompresses a compressed box node to obtain box information. In some examples, decompression occurs as described with respect to FIG. 8. At step 904, an entity such as the ray tracing pipeline 300 tests a ray against the obtained decompressed box node, as described elsewhere herein.

Note that although the present disclosure sometimes refers to triangles as being in the leaf nodes of the bounding volume hierarchy, any other geometric shape could alternatively be used in the leaf nodes. In such instances, compressed triangle blocks include two or more such primitives that share at least one vertex.

Each of the units illustrated in the figures represent hardware circuitry configured to perform the operations described herein, software configured to perform the operations described herein, or a combination of software and hardware configured to perform the steps described herein. For example, the ray tracing pipeline 300, ray generation shader 302, any hit shader 306, hit or miss unit 308, miss shader 312, closest hit shader 310, and acceleration structure traversal stage 304 are implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   combining one or more common exponent values of a compressed box node with one or more minimum vertex mantissas of the compressed box node and one or more maximum vertex mantissas of the compressed box node to obtain one or more minimum vertices and one or more maximum vertices; and
   combining a minimum vertex of the one or more minimum vertices and a maximum vertex of the one or more maximum vertices to obtain a bounding box for a compressed box data item of the compressed box node.

2. The method of claim 1, wherein:
   the common exponent values include one common exponent value for each coordinate component.

3. The method of claim 1, wherein the common exponent values are shared across multiple box data items of a box node.

4. The method of claim 1, wherein the common exponent values are shared between minimum vertex mantissas and maximum vertex mantissas of a box node.

5. The method of claim 1, further comprising:
   obtaining a pointer to a child compressed box data item within a child box node of the compressed box node by combining a first child pointer of the compressed box data item with information for other child compressed box data items of the child box node.

6. The method of claim 1, further comprising:
   expanding the one or more minimum vertex mantissas of the compressed box node and the one or more maximum vertex mantissas of the compressed box node to obtain the one or more minimum vertices and the one or more maximum vertices.

7. The method of claim 1, further comprising:
   compressing a box node to generate the compressed box node.

8. The method of claim 7, wherein compressing the box node further comprises identifying common exponents for each coordinate component of a box node.

9. The method of claim 1, further comprising:
   performing a ray-box intersection test with the bounding box.

10. A system comprising:
    a memory configured to store a compressed box node; and
    a processor coupled to the memory and configured to perform operations comprising:
      combining one or more common exponent values of the compressed box node with one or more minimum vertex mantissas of the compressed box node and one or more maximum vertex mantissas of the compressed box node to obtain one or more minimum vertices and one or more maximum vertices; and
      combining a minimum vertex of the one or more minimum vertices and a maximum vertex of the one or more maximum vertices to obtain a bounding box for a compressed box data item of the compressed box node.

11. The system of claim 10, wherein:
the common exponent values include one common exponent value for each coordinate component.

12. The system of claim 10, wherein the common exponent values are shared across multiple box data items of a box node.

13. The system of claim 10, wherein the common exponent values are shared between minimum vertex mantissas and maximum vertex mantissas of a box node.

14. The system of claim 10, wherein the processor is further configured to:
obtain a pointer to a child compressed box data item within a child box node of the compressed box node by combining a first child pointer of the compressed box data item with information for other child compressed box data items of the child box node.

15. The system of claim 10, wherein the processor is further configured to:
expand the one or more minimum vertex mantissas of the compressed box node and the one or more maximum vertex mantissas of the compressed box node to obtain the one or more minimum vertices and the one or more maximum vertices.

16. The system of claim 10, wherein the processor is further configured to:
compress a box node to generate the compressed box node.

17. The system of claim 16, wherein compressing the box node further comprises identifying common exponents for each coordinate component of a box node.

18. The system of claim 10, wherein the processor is further configured to:
perform a ray-box intersection test with the bounding box.

19. A non-transitory computer-readable medium storing instructions that, when executed by a processor, causes the processor to perform operations comprising:
combining one or more common exponent values of a compressed box node with one or more minimum vertex mantissas of the compressed box node and one or more maximum vertex mantissas of the compressed box node to obtain one or more minimum vertices and one or more maximum vertices; and
combining a minimum vertex of the one or more minimum vertices and a maximum vertex of the one or more maximum vertices to obtain a bounding box for a compressed box data item of the compressed box node.

20. The non-transitory computer-readable medium of claim 19, wherein:
the common exponent values include one common exponent value for each coordinate component.

* * * * *